US009519520B2

(12) United States Patent
Krueger

(10) Patent No.: US 9,519,520 B2
(45) Date of Patent: Dec. 13, 2016

(54) FEDERATED, POLICY-DRIVEN SERVICE MESHES FOR DISTRIBUTED SOFTWARE SYSTEMS

(75) Inventor: Ingolf Heiko Krueger, San Diego, CA (US)

(73) Assignee: ViaSat, Inc., Carlsbad, CA (US)

( * ) Notice: Subject to any disclaimer, the term of this patent is extended or adjusted under 35 U.S.C. 154(b) by 424 days.

(21) Appl. No.: 13/281,309

(22) Filed: Oct. 25, 2011

(65) Prior Publication Data

US 2013/0103837 A1 Apr. 25, 2013

(51) Int. Cl.
| | | |
|---|---|---|
| *G06F 15/173* | (2006.01) | |
| *G06F 15/16* | (2006.01) | |
| *H04L 12/28* | (2006.01) | |
| *H04H 20/71* | (2008.01) | |
| *H04W 4/00* | (2009.01) | |
| *H04J 4/00* | (2006.01) | |
| *G06F 9/50* | (2006.01) | |

(52) U.S. Cl.
CPC .................................. *G06F 9/5072* (2013.01)

(58) Field of Classification Search
CPC .... H04L 41/145; H04L 41/5096; H04L 45/00;
H04L 45/302; H04L 45/22; H04L 45/28;
H04L 45/122; H04L 41/12; H04L 41/21;
H04L 41/0893; H04L 29/06; H04L 29/08;
H04L 67/10; H04L 67/34; H04L 67/42
USPC ........ 709/223, 226, 229, 238, 249; 370/255,
370/312, 328, 338, 351
See application file for complete search history.

(56) References Cited

U.S. PATENT DOCUMENTS

| | | | | |
|---|---|---|---|---|
| 6,886,102 | B1 * | 4/2005 | Lyle ...................... | G06F 21/554 |
| | | | | 709/206 |
| 8,412,810 | B1 * | 4/2013 | Tompkins ........... | G06F 9/45558 |
| | | | | 709/201 |
| 2008/0069082 | A1 * | 3/2008 | Patrick .................. | H04L 41/145 |
| | | | | 370/351 |
| 2010/0088150 | A1 | 4/2010 | Mazhar et al. | |
| 2010/0131649 | A1 | 5/2010 | Ferris | |

(Continued)

OTHER PUBLICATIONS

PCT/US2012/061669 International Search Report and Written Opinion dated Mar. 13, 2013.

(Continued)

*Primary Examiner* — Farzana Huq
(74) *Attorney, Agent, or Firm* — Knobbe Martens Olson & Bear, LLP

(57) ABSTRACT

Platforms, systems, software, and methods for deploying and maintaining distributed computing, networking and storage comprising a configuration of dedicated service meshes. The invention further comprising a module for dynamically managing physical nodes; a module for dynamically managing nodes on physical nodes; a module for dynamically managing services/workers on nodes; a module for governing communication within the system and with the system; a plurality of communication endpoints; a plurality of services, wherein each service is associated with one or more endpoints, wherein services communicate by message exchange via their endpoints; a module for grouping nodes into clusters; a module for grouping endpoints into meshes such that all member services of a mesh can be addressed as a whole or as pertinent subsets thereof; and a module for dynamically effecting topology changes.

12 Claims, 9 Drawing Sheets

(Continued)

(56) References Cited

U.S. PATENT DOCUMENTS

| | | | | |
|---|---|---|---|---|
| 2010/0293555 A1* | 11/2010 | Vepsalainen | ............ | G06F 9/546 719/313 |
| 2011/0153727 A1* | 6/2011 | Li | ................................ | 709/203 |
| 2011/0231477 A1 | 9/2011 | Safruti et al. | | |
| 2012/0151056 A1* | 6/2012 | Sporel | ..................... | H04L 45/02 709/225 |
| 2012/0303790 A1* | 11/2012 | Singh | .................... | G06F 9/5072 709/224 |
| 2013/0097708 A1* | 4/2013 | Jayanthi | ................ | G06F 21/554 726/25 |
| 2013/0227091 A1* | 8/2013 | Tompkins | ........... | G06F 9/45558 709/220 |

OTHER PUBLICATIONS

Armbrust et al., "Above the Clouds: A Berkeley View of Cloud Computing," Electrical Engineering and Computer Sciences, University of California at Berkeley, Technical Report No. UCB/EECS-2009-28 (Feb. 10, 2009).

Buyya et al., "InterCloud: Utility-Oriented Federation of Cloud Computing Environments for Scaling of Application Services," Proceedings of the 10th International Conference on Algorithms and Architectures for Parallel Processing (ICA3PP 2010, ENCS 6081, Springer, Germany), 13-31pp, Busan, South Korea, May 21-23, 2010.

Distributed Mantigement Task Force, Inc., "Interoperable Clouds: A White Paper from the Open Cloud Standards Incubator," Distibuted Management Task Force, Inc. (2009) Doc. No. DSP-IS0101.

\* cited by examiner

FEDERATED, POLICY-DRIVEN SERVICE MESHES FOR DISTRIBUTED SOFTWARE SYSTEMS

FIELD OF THE INVENTION

The present invention concerns the field of scalable, fault-tolerant and secure distributed software systems.

BACKGROUND OF THE INVENTION

"The cloud" is the emerging outsourced commodity infrastructure for computation, storage, and networking that is increasingly becoming the backbone for all of IT—especially in market segments that must scale rapidly and to global dimensions, such as healthcare, finance, energy, and government/public safety.

Ideally, a cloud infrastructure customer would develop their software and enjoy automatic benefits of scale, fault-tolerance, and security at substantially reduced maintenance costs so that the cloud-customer can be assured of the quality of the resulting system despite it being no longer under their full ownership or control.

However, software development for the cloud is challenging and far from an automatic process. The heterogeneous nature of potential deployment platforms and partners, the rapidly evolving base technologies, and the focus on systems over applications all contribute to elevated complexity of architecture and development for cloud applications. The lack of standards, tools and even expectations for these, create challenges for development. This results in a lack of trust in the use of cloud infrastructure, especially for demanding applications in the mentioned problem and application domains.

SUMMARY OF THE INVENTION

High-availability software systems require a deployment concept that allows entire data centers to go down without significant disruption to the user of the software system. Cloud-infrastructure providers occasionally do experience outages of entire segments of their infrastructure—rendering the applications deployed only on those segments unusable. If the application was distributed across multiple cloud infrastructure providers, such that an outage in one leaves the other unaffected, the application would still be responsive.

However, such a deployment across cloud-infrastructure providers today is hindered by the lack of standards, as well as a heterogeneity in the underlying infrastructure technologies, monitoring, and billing interfaces, to name but a few of the challenges. This results in high development and maintenance costs for such cloud applications. To date, secure and reliable messaging, routing, and processing have not been integrated into a seamless, scalable, secure and reliable cloud application development, deployment, execution, and maintenance framework.

Moreover, existing offerings focus on data centers and servers; the approach disclosed herein combines these with computational resources on the fringes of the cloud including, for example, stationary and mobile devices, computationally capable sensors, actuators, sensor/actuator combinations, cell phones, smart-phones, laptop computers, tablet computers, electronic control units, set-top boxes, and displays. Our solution integrates these mobile and stationary devices into a common fabric upon which cloud-applications can be developed, deployed, executed, operated and maintained. The current focus on traditional computational and networking resources, as they are present in classical, individual data centers, leaves the vast number of mobile and stationary devices (e.g., computationally capable sensors, actuators, sensor/actuator combinations, mobile phones, smart phones, laptop computers, tablet computers, electronic control units, set-top boxes, displays, etc.) outside of traditional data centers untapped as possible elements of the cloud-infrastructure. Their integration into a composite, however, requires an extension of the circle of trust from the regular data-center-backed cloud environment to computational and networking resources on its fringes.

Manual software development under such a high degree of distribution, mobility, scale, need for fault tolerance and information assurance, without physical control over most of the resources requires high amounts of effort, is very error-prone, and is costly.

Accordingly, one object of the present invention is to avoid the above-mentioned problems fully or at least in part. Another object is to shorten the process of program development for cloud-applications. Another object is to avoid possible sources of error. Another object of the invention is the partial or full automation of cloud-application deployment, operation and maintenance. Another object is to provide these benefits to public, private, and hybrid cloud infrastructures, including those where computational and networking resources are located outside of classic data centers, such as in servers internal or external to an organization, or in computationally capable sensors, actuators, sensor/actuator combinations, mobile phones, smart phones, laptop computers, tablet computers, electronic control units, set-top boxes, and displays. For simplicity, we call this collective of computational, networking and data resources the "dynamic computation plane."

According to the invention, these and other objects are attained by a software deployment and management platform that enables easier and more sustainable development and deployment of integrated software on the dynamic computation plane. The platform enables building large-scale, complex software systems to utilize the unique advantages of cloud providers to accelerate application development and deployment, provide better management and maintenance strategies, and allows for secure, fault-tolerant, dynamic scaling based on real-time usage across the entire dynamic computation plane.

Disclosed herein, in certain embodiments, are systems, software, and methods for the creation, implementation, and maintenance of elastically scalable, fault-tolerant and secure distributed software systems. In some embodiments, these attributes are achieved through a combination of software layers handling the creation and destruction, communication, security and fault-tolerance of the aggregate system. The particular field of the invention is the architecture and interplay of these layers to enable the mentioned properties. The invention is particularly well-suited to be used in connection with cloud-deployments of software systems, where the hard- and software-platform for executing the software system is dynamically provisioned on arbitrary Internet-addressable appliances, including virtual and physical servers within one data center and across multiple data centers, and other virtual and physical stationary or mobile devices, including desktop computers, laptop computers, tablet computers, mobile phones, smart phones, electronic control units, set-top boxes, and displays. In some embodiments, the invention creates a virtual service mesh across all enabled resources, and makes these resources available subject to policy constraints to satisfy fault-tolerance and information assurance requirements, while enabling dynamic scaling of this mesh.

In one aspect, disclosed herein, in certain embodiments, are distributed computing platforms comprising: a plurality of cloud-infrastructures and software for the creation, implementation, operation, and maintenance of a policy-based, federated network of said cloud-infrastructures for the deployment of applications across multiple independent data centers, cloud providers, or other physical nodes. In some embodiments, one or more physical nodes are on the fringes of a cloud.

In another aspect, disclosed herein, in certain embodiments, are computer readable media encoded with a computer program including instructions executable to create a distributed, federated computing software platform, wherein the platform comprises: a software module for dynamically managing physical nodes; a software module for dynamically managing nodes on physical nodes; a software module for dynamically managing services/workers on nodes; a software module for governing communication within the system and with the system; a plurality of communication endpoints; a plurality of services, wherein each service is associated with one or more endpoints, wherein services communicate by message exchange via their endpoints; a software module for grouping nodes into clusters; a software module for grouping endpoints into meshes such that all member services of a mesh can be addressed as a whole or as pertinent subsets thereof; and a software module for dynamically effecting topology changes; whereby the platform provides a configuration of policy-based, federated service meshes. In some embodiments, one or more of said modules, or an integration of one or more of said modules, is policy-based and federated. In some embodiments, the module for dynamically managing physical nodes offers management functions selected from the group consisting of: allocating, creating, deploying, relocating, and destroying physical nodes. In some embodiments, the module for dynamically managing nodes on physical nodes offers management functions selected from the group consisting of: allocating, creating, deploying, relocating, and destroying nodes on physical nodes. In some embodiments, the module for dynamically managing services/workers on nodes offers management functions selected from the group consisting of: allocating, creating, deploying, relocating, and destroying services/workers on nodes. In some embodiments, the platform further comprises a policy-based module for constraining communication among nodes to those that belong to the same cluster. In some embodiments, the platform further comprises a policy-based module for governing communication among services/workers. In some embodiments, the topology changes comprise changes in the associations between physical nodes, nodes, communication endpoints, services/workers, meshes, clusters, and combinations thereof. In some embodiments, the platform distributes computing, networking, or storage across a plurality of cloud infrastructures. In further embodiments, the platform distributes computing, networking, or storage across a plurality of private, public, or hybrid clouds. In some embodiments, one or more physical nodes are stationary servers. In some embodiments, one or more physical nodes are selected from the group consisting of: mobile devices, computationally capable sensors, actuators, sensor/actuator combinations, cell phones, smart-phones, laptop computers, tablet computers, electronic control units, set-top boxes, and displays. In some embodiments, the platform is installed by an end user. In other embodiments, the platform is offered as a service.

In another aspect, disclosed herein, in certain embodiments, are distributed computing platforms comprising: at least one computing device; and software, provided to the at least one computing device, for creating, implementing, operating, and maintaining a federated, policy-controlled system of communicating processes across a dynamic computation plane, said system comprising: a module for dynamically managing physical nodes; a module for dynamically managing nodes on physical nodes; a module for dynamically managing services/workers on nodes; a module for governing communication within the system and with the system; a plurality of communication endpoints; a plurality of services, wherein each service is associated with one or more endpoints, wherein services communicate by message exchange via their endpoints; a module for grouping nodes into clusters; a module for grouping endpoints into meshes such that all member services of a mesh can be addressed as a whole or as pertinent subsets thereof; and a module for dynamically effecting topology changes; whereby the platform provides a configuration of policy-based, federated service meshes. In some embodiments, one or more of said modules, or an integration of one or more of said modules, is policy-based and federated. In some embodiments, the software module for dynamically managing physical nodes offers management functions selected from the group consisting of: allocating, creating, deploying, relocating, and destroying physical nodes. In some embodiments, the software module for dynamically managing nodes on physical nodes offers management functions selected from the group consisting of: allocating, creating, deploying, relocating, and destroying nodes on physical nodes. In some embodiments, the software module for dynamically managing services/workers on nodes offers management functions selected from the group consisting of: allocating, creating, deploying, relocating, and destroying services/workers on nodes. In some embodiments, the system further comprises a policy-based software module for constraining communication among nodes to those that belong to the same cluster. In some embodiments, the system further comprises a policy-based module for governing communication among services/workers. In some embodiments, the topology changes comprise changes in the associations between physical nodes, nodes, communication endpoints, services/workers, meshes, clusters, and combinations thereof. In some embodiments, the platform distributes computing, networking, or storage across a plurality of cloud infrastructures. In further embodiments, the platform distributes computing, networking, or storage across a plurality of private, public, or hybrid clouds. In some embodiments, one or more physical nodes are stationary servers. In some embodiments, one or more physical nodes are selected from the group consisting of: mobile devices, computationally capable sensors, actuators, sensor/actuator combinations, cell phones, smart-phones, laptop computers, tablet computers, electronic control units, set-top boxes, and displays. In some embodiments, the platform is installed by an end user. In other embodiments, the platform is offered as a service.

In another aspect, disclosed herein, in certain embodiments, are methods for creating, implementing, operating, and maintaining distributed, federated computing and storage applications comprising: providing a mechanism for dynamically managing physical nodes; providing a policy-based mechanism for dynamically managing nodes on physical nodes; providing a policy-based mechanism for dynamically managing services/workers on nodes; providing a federated, policy-based mechanism for governing communication within the system and with the system; providing a plurality of communication endpoints; providing a plurality of services, wherein each service is associated with one or more endpoints, wherein services communicate by message exchange via their endpoints; providing a federated mechanism for grouping nodes into clusters; providing a federated mechanism for grouping endpoints into meshes such that all member services of a mesh can be addressed as a whole or as pertinent subsets thereof; and providing a policy-based mechanism for dynamically effecting topology changes; thereby providing a configuration of dedicated service meshes. In some embodiments, the mechanism for dynamically managing physical nodes offers management functions selected from the group consisting of: allocating, creating, deploying, relocating, and destroying physical nodes. In some embodiments, the mechanism for dynamically managing nodes on physical nodes offers management functions selected from the group consisting of: allocating, creating, deploying, relocating, and destroying nodes on physical nodes. In some embodiments, the mechanism for dynamically managing services/workers on nodes offers management functions selected from the group consisting of: allocating, creating, deploying, relocating, and destroying services/workers on nodes. In some embodiments, the method further comprises providing a policy-based mechanism for constraining communication among nodes to those that belong to the same cluster. In some embodiments, the topology changes comprise changes in the associations between physical nodes, nodes, communication endpoints, services/workers, meshes, clusters, and combinations thereof. In some embodiments, computing and storage is distributed across a plurality of cloud infrastructures. In some embodiments, computing and storage is distributed across a plurality of private, public, or hybrid clouds. In some embodiments, one or more physical nodes are stationary or virtual servers. In some embodiments, one or more physical nodes are selected from the group consisting of: mobile devices, computationally capable sensors, actuators, sensor/actuator combinations, cell phones, smart-phones, laptop computers, tablet computers, electronic control units, set-top boxes, and displays.

In another aspect, disclosed herein, in certain embodiments, are methods of responding to an external denial-of-service attack by means of a policy within the platform described herein that compares message sources with pre-determined white-lists of addresses, reprovisions fresh nodes to deal with additional incoming requests, and creates fresh instances of the entire topology only accessible by whitelisted request sources.

In another aspect, disclosed herein, in certain embodiments, are methods of increasing availability of distributed software applications via a triple-modular redundant deployment of workers across multiple independent data centers or cloud providers, or physical nodes across the cloud and its fringes.

DETAILED DESCRIPTION OF THE INVENTION

Certain Definitions

Figure 1:
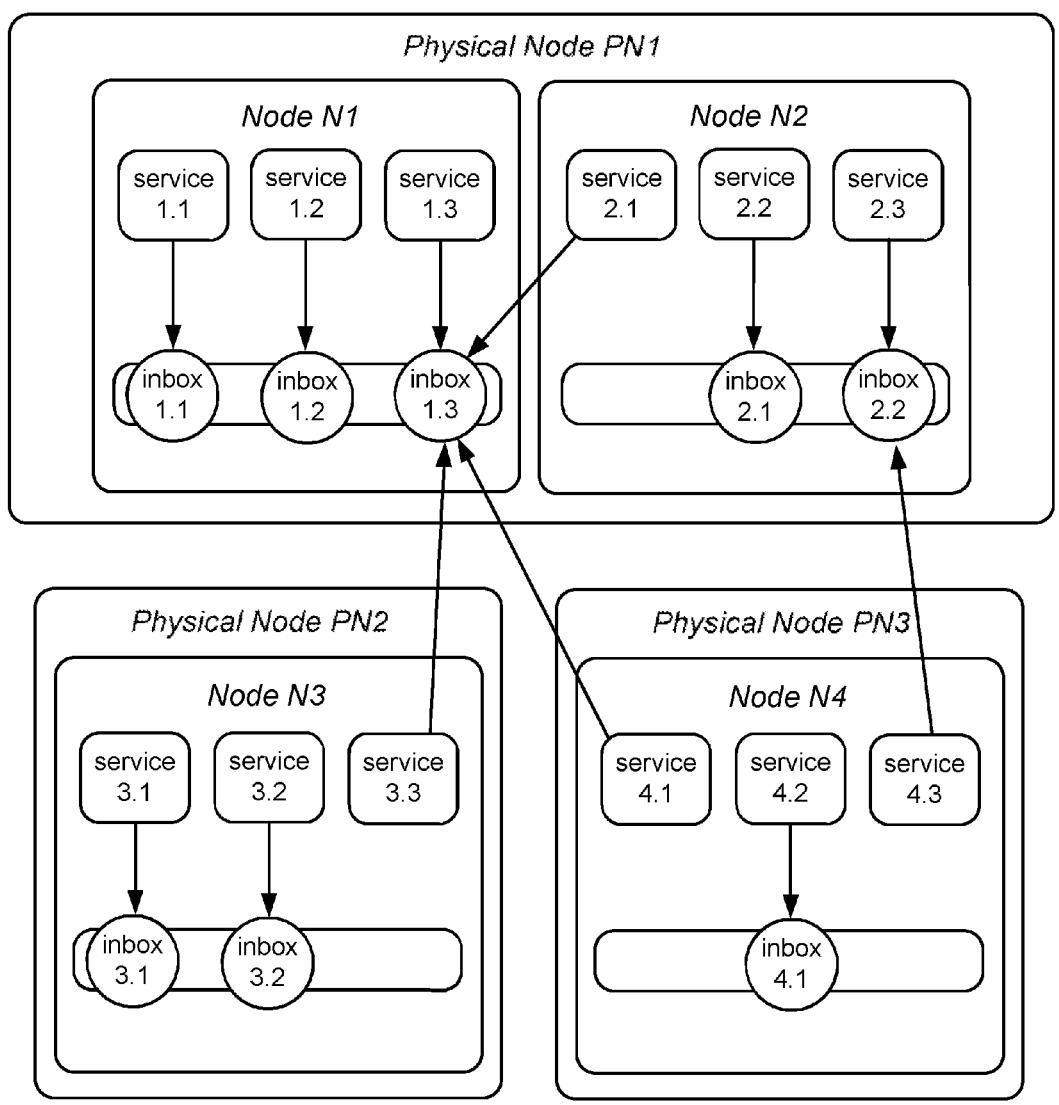
FIG. 1 shows a non-limiting, exemplary instance of the fabric consisting of three physical nodes PN1, PN2 and PN3. In this example, PN1 contains two nodes, N1 and N2. N1 contains three inboxes (labeled inbox 1.1, inbox 1.2 and inbox 1.3), and three services (labeled service 1.1, service 1.2 and service 1.3). N2 contains two inboxes (inbox 2.1 and inbox 2.2) and three services (service 2.1, service 2.2 and service 2.3). PN2 and PN3 contain nodes N3 and N4, respectively, with associated inboxes and services. Services 1.3, 2.1, 3.3 and 4.1 all are associated with and process messages arriving at inbox 1.3.

Unless otherwise defined, all technical and scientific terms used herein have the same meaning as commonly understood by one of ordinary skill in the art to which this invention belongs.

As used in this specification and the appended claims, the singular forms "a," "an," and "the" include plural references unless the context clearly dictates otherwise. Any reference to "or" herein is intended to encompass "and/or" unless otherwise stated.

As used herein, "physical node" means a physical or virtualized, networked computational resource, such as a stationary or virtual server, or a mobile device including, but not limited to, mobile phones, smart phones, computationally capable sensors, actuators, sensor/actuator combinations, laptop computers, tablet computers, electronic control units, set-top-boxes, and displays.

As used herein, "node" means a collection of endpoints and processes. In some embodiments, a node exists within a physical node. In some embodiments, multiple nodes share a physical node.

As used herein, "endpoint" means a source or destination for messages. In some embodiments, an endpoint is implemented as a message queue (or message queue address), or set of queues (or set of addresses of message queues).

As used herein, "service specification" and "worker specification" are synonyms for a message transducer specification. A basic message transducer accepts a stream of incoming messages, producing a stream of messages as its result. This generalizes to the case where the message transducer operates on a tuple of message streams, producing a set of tuples of message streams as its result.

As used herein, "service/worker" means an executable process implementing a service/worker specification.

As used herein, "inbox" refers to an endpoint that is a message destination associated with at least one service/worker.

As used herein, "mesh" means a collection of endpoints (such as those associated with services) that can be addressed as a whole.

As used herein, a "distributed system" consists of multiple autonomous processes that communicate with one another to achieve a common goal.

As used herein, a "federated system" is a distributed system in which the common goal is achieved without the introduction of single points of failure.

As used herein, a "cloud provider" is an entity offering the static or dynamic provisioning of computational, networking, or storage resources. This encompasses commercial providers such as Amazon AWS and Rackspace, but also more specialized cases where a domain of authority (individual or organization) grants access to a computational resource such as a private data center, public data center, a hybrid of private and public data center, individual servers, server grids, mobile phones, smart phones, sensors, actuators, sensor/actuator combinations, tablet computers, electronic control units, set-top-boxes, and displays.

As used herein, "cloud infrastructure" refers to private clouds, public clouds, hybrid clouds, the fringes of private clouds, the fringes of public clouds, the fringes of hybrid clouds, and combinations thereof.

As used herein, the "fringes" of the cloud are computational, networking and data resources outside of traditional cloud execution environments such as public, private or hybrid data centers; specifically, we define individual servers, server grids, mobile phones, smart phones, sensors, actuators, sensor/actuator combinations, laptop computers, tablet computers, electronic control units, set-top-boxes, and displays to be elements of the fringes of the cloud.

As used herein, the "context" of a computational, networking, or storage entity (such as a message, event, service, node, or physical node) includes, but is not limited to, state information pertaining to the entity's physical location, location within the dynamic computation plane, authenticity, authentication, session, failure status, past messaging history, energy consumption or profile, end-user experience, indices reflecting quality aspects including throughput, availability, existence of routing paths, quality scores for voice or video connections, subsets of the entire system state (including subsystems inside, outside, or on the fringes of the system at hand), or combinations of all of the above.

As used herein, "creation" of an entity or resource refers to either the bringing into existence of an entity or resource, or the allocation of an entity or resource from a pool of existing entities or resources.

As used herein, "destruction" of an entity or resource refers to either the removal from existence of an entity or resource, or the returning of an entity or resource into a pool of available entities or resources.

Service and Endpoint Fabric

In some embodiments, the service and endpoint fabric described herein establishes a federated system of communicating processes across physical nodes within the dynamic computation plane. Physical nodes play host to nodes, which—in turn—aggregate endpoints and services together with lifecycle services for managing them.

These lifecycle services include, by way of non-limiting examples:

1) Dynamic creation and destruction of physical nodes (taking advantage of cloud-providers' capabilities).

2) Dynamic creation and destruction of nodes on given physical nodes.

3) Dynamic creation and destruction of workers/services and endpoints on specified nodes.

4) Dynamic association between services and existing endpoints.

5) Dynamic and static creation and destruction of communication paths between workers/services regardless of the node they are located on.

6) Enablement of a variety of communication patterns, including asynchronous and synchronous message exchange.

7) Enablement for communication under timeout, such that the sender of a communication is notified if the recipient has failed to acknowledge the communication within a specified time frame (the "timeout").

8) Dynamic transmission of process specifications to specified nodes, and execution of these process specifications on those nodes.

9) Association of a node with a security token.

10) Dynamic association of a "policy-guard", i.e., a specific service/worker filtering messages, with an endpoint such that messages targeting this endpoint are subjected to the policy (typically a predicate that determines whether the given message in the given context is allowed to pass the filter).

11) Dynamic association of a policy-guard with an endpoint such that messages emanating from this endpoint are subjected to the policy.

12) Dynamic reconfiguration of the topology, specifically of the associations between nodes and physical nodes, between endpoints and nodes, and between services and nodes, pursuant to a policy.

Specifically, in certain embodiments, a node can exist on any physical node within the dynamic computation plane. Any suitable number of nodes exist on any physical node within the dynamic computation plane at any given point in time in any particular embodiment of the invention. Moreover, any suitable number of physical nodes exist within the dynamic computation plane at any given point in time. In various embodiments, 1, 10, $1\times10^2$, $1\times10^3$, $1\times10^4$, $1\times10^5$, $1\times10^6$, $1\times10^7$, $1\times10^8$, $1\times10^9$, $1\times10^{10}$, $1\times10^{11}$, $1\times10^{12}$, or more (including increments therein) physical nodes exist within the dynamic computation plane at any given point in time. In further various embodiments, 1, 10, $1\times10^2$, $1\times10^3$, $1\times10^4$, $1\times10^5$, $1\times10^6$, $1\times10^7$, $1\times10^8$, $1\times10^9$, $1\times10^{10}$, $1\times10^{11}$, $1\times10^{12}$, or more (including increments therein) nodes exist on any physical node at any given point in time. In some embodiments, nodes aggregate services and their endpoints, and provide mechanisms for creating and destroying endpoints and services on the dynamic computation plane, as well as for associating services with existing endpoints. Any suitable number of services and endpoints exist within the dynamic computation plane at any given point in time in any particular embodiment of the invention. In various embodiments, 1, 10, $1\times10^2$, $1\times10^3$, $1\times10^4$, $1\times10^5$, $1\times10^6$, $1\times10^7$, $1\times10^8$, $1\times10^9$, $1\times10^{10}$, $1\times10^{11}$, $1\times10^{12}$, or more (including increments therein) services and/or endpoints exist within the dynamic computation plane at any given point in time, with any suitable number of services and endpoints aggregated at any particular node. In some embodiments, when a node is created it is equipped with a security token. In further embodiments, communication can only occur between nodes that share the same security token. In further embodiments, process, or worker/service specifications are transmitted to existing nodes, deployed and executed there. In further embodiments, nodes register the services/workers, and their endpoints, deployed on them using a suitable associative data store/structure.

In some embodiments, services communicate via their endpoints, accepting messages as input (at their associated inbox) and producing messages in response. Deployment of services is highly flexible, enabling a wide range of deployment and interaction topologies. By way of example, multiple services can process messages from a single inbox, and those services can exist on the same node, leveraging multi-core architectures, or be distributed across different physical nodes to achieve a higher degree of parallelism. By way of further example, if multiple services are associated with the same inbox, some or all of them are invoked with the same message. In some embodiments, the order in which these services receive a copy of the message is subject to a pluggable policy, with round-robin being the default, for example. In some embodiments, a message is not acknowledged as received by a service until that service successfully processes it. In such embodiments, services can send messages to any inbox, provided the nodes involved in the communication all share the same security token. Consequently, services can process messages from remote inboxes.

In some embodiments, the system will dynamically reconfigure its topology (either automatically, or via triggers from its environment), pursuant to a policy. By way of non-limiting examples, in such embodiments the policy will determine geographical or logical constraints on where physical nodes, nodes, endpoints, and services can be located within the dynamic computation plane; or will determine topology changes to accomplish an optimal energy-balance to be observed across all members of the dynamic computation plane participating in an instance of the system; or will determine topology changes in response to quality constraints (such as indices associated with voice and video quality across networks, availability, throughput); or will determine topology changes to react to events in the context of the system or its constituents (including, but not limited to, user experience, health of systems or subsystems, results of analytics processing on the context of the system). In some embodiments, dynamic topology changes are effected by modifications of the associations between physical nodes, nodes, endpoints, and services via the mentioned corresponding lifecycle functions for dynamic creation, deployment, deletion of physical nodes, nodes, endpoints, and services. In some embodiments, dynamic topology changes will result in the relocation of a physical node within one data center, or from one data center to another. In some embodiments, dynamic topology changes will result in the relocation of a node from one physical node to another, regardless of the physical location of either physical node. In some embodiments, dynamic topology changes will result in the relocation of endpoints or services from one node to another, regardless of the location of either node.

FIG. 1 shows an exemplary instance of the fabric consisting of three physical nodes PN1, PN2 and PN3. PN1 contains two nodes, N1 and N2. N1 contains three inboxes (labeled inbox 1.1, inbox 1.2 and inbox 1.3), and three services (labeled service 1.1, service 1.2 and service 1.3). N2 contains two inboxes (inbox 2.1 and inbox 2.2) and three services (service 2.1, service 2.2 and service 2.3). PN2 and PN3 contain nodes N3 and N4, respectively, with associated inboxes and services. Services 1.3, 2.1, 3.3 and 4.1 all are associated with and process messages arriving at inbox 1.3.

In some embodiments, the invention assumes the existence of secure, scalable and fault-tolerant messaging systems that can be used to implement endpoints via messaging queues.

Thus, a sample embodiment of the fabric would be given by the following mapping:
 1) PN1->Amazon AWS server, PN2->mobile phone, PN3->tablet computer
 2) N1, N2, N3->Java Virtual Machine (JVM) executing Clojure, N4->bespoke runtime system (e.g., iOS 5, etc.). Each of these would have implementations of the lifecycle functions for nodes, inboxes, communication, and services.
 3) Inboxes 1.1 through 3.2->HornetQ message queues, Inbox 4.1 bespoke message queue implementation in Objective C with adapters to the HornetQ infrastructure (for instance, via HTTP or TCP/IP connectors to HornetQ).
 4) Services 1.1 through 3.3: Clojure functions (message transformers) listening for messages on the associated endpoints. Services 4.1 through 4.3: bespoke message transformer functions, implemented in Objective C. Each of the message transformers is invoked with the message available at the endpoint.

One implementation option for services in Clojure (available at http://www.clojure.org/) is via functions that take an inbox address and return a message handler function, which is invoked on messages as they arrive in the inbox. One implementation option for inboxes in Clojure is as IP address/port number pairs. One implementation option for the message queues associated with inboxes is to use message queues as provided by HornetQ (available at http://www.jboss.org/hornetq) (alternatively, and non-exclusively, RabbitMQ (available at http://www.rabbitmq.com/) or ActiveMQ (available at http://activemq.apache.org/))—leveraging their provisions for messaging security and reliability. On physical nodes where these products are unavailable, one implementation option is to create basic queue implementations that then integrate via proxies or adapters with message queues on the outside (such as HornetQ, RabbitMQ, ActiveMQ, etc.).

It is important to note that the type of physical node on which the endpoints and services exist is irrelevant—as long as it can support the concepts of endpoints and message-transducing services triggered by messages arriving on these endpoints. Specifically, the invention includes the case where the physical nodes are stationary or mobile devices that become part of the service and endpoint fabric as fringes of the cloud.

Federated Service Meshes

To facilitate policy-based information assurance, availability and failover, the invention, in certain embodiments, introduces the concepts of Clusters and Meshes. In further embodiments, together, these concepts allow management of related inboxes (and thus their related services) so that they can be addressed as a collective, rather than only by individual communication with each individual service.

In some embodiments, clusters establish a grouping of multiple nodes that are managed as a federated collective.

Any suitable number of clusters exist at any given point in time in any particular embodiment of the invention. In various embodiments, 1, 10, $1\times10^2$, $1\times10^3$, $1\times10^4$, $1\times10^5$, $1\times10^6$, $1\times10^7$, $1\times10^8$, $1\times10^9$, $1\times10^{10}$, $1\times10^{11}$, $1\times10^{12}$, or more (including increments therein) clusters exist at any given point in time, with any suitable number of nodes grouped in any particular cluster. In further embodiments, each node in the cluster has a cluster manager, which keeps track of the set of nodes in that cluster (the cluster's topology) and provides facilities for dynamically creating and modifying this topology. In still further embodiments, each cluster manager has a unique identifier (ID) number. In some embodiments, this ID can be set or updated dynamically. In some embodiments, each cluster has a lead cluster manager, which distributes topology changes to all members of the cluster. In further embodiments, all cluster managers individually maintain data structures reflecting the overall cluster's topology. In some embodiments, the cluster managers use the topology information to route messages between endpoints. In further embodiments, cluster managers detect whether their lead cluster manager has become unresponsive (through network failure, or more generic system failure); in that case the cluster manager with the lowest ID number becomes the new lead cluster manager. Because each such cluster manager has a copy of the cluster's topology, no voting mechanism is necessary to determine the new leader. In further embodiments leader-election algorithms are used in determining the new leader to guard (among others) against network partitions. In further embodiments, the cluster registers itself with an external registry, notifies the external registry of topology changes, and the external registry determines the next leader in case of failure.

The concept of clusters, in some embodiments, allows the grouping of multiple nodes into a common structure. Meshes, on the other hand, allow the dynamic grouping and control of inboxes within the same cluster, but across nodes, for example. Any suitable number of meshes exist at any given point in time in any particular embodiment of the invention. In various embodiments, 1, 10, $1\times10^2$, $1\times10^3$, $1\times10^4$, $1\times10^5$, $1\times10^6$, $1\times10^7$, $1\times10^8$, $1\times10^9$, $1\times10^{10}$, $1\times10^{11}$, $1\times10^{12}$, or more (including increments therein) meshes exist at any given point in time, with any suitable number of inboxes grouped and controlled in any particular mesh. In some embodiments, meshes provide the means to address their members individually, or collectively. In further embodiments, a message sent to a mesh will be forwarded to its constituent inboxes pursuant to a set of policies that can be specified individually for each message, message sender, message recipient, or for the mesh as a whole. In some embodiments, the cluster provides facilities to send messages to some, or all members (services/endpoints) of the cluster, and do so under observation of a policy.

In some embodiments, policies are predicates that determine for a given message whether a given service, or mesh, is able to accept, process or send that message. This predicate can depend on a broad range of context conditions, including, by way of non-limiting examples, authenticity, authentication, session, past messaging history, or subsets of the entire system state (including subsystems inside, outside, or on the fringes of the system at hand).

Through the policy system, meshes, in various embodiments, allow the infrastructure to establish resource groups according to scalability, security, availability, or failover policies, or other more generic policies, yielding unprecedented flexibility and control for service deployment and consumption.

In some embodiments, cluster managers provide plug-ins (using a callback and call-back-handler architecture) for services that statically or dynamically provision physical nodes, or nodes. In further embodiments, this plug-in point allows each cluster, or each mesh, to set fine-grained policies on how and where new physical nodes, or nodes are provisioned or decommissioned.

In some embodiments, the cluster managers of a cluster manage the lifecycle of all meshes defined for that cluster. In some embodiments, meshes are preconfigured. In some embodiments, meshes form on the fly. In some embodiments, meshes are both preconfigured and form on the fly.

In some embodiments, the cluster (via its cluster managers) provides facilities for dynamically creating and destroying nodes and including them in and excluding them from the cluster, respectively. In some embodiments, the cluster provides facilities for dynamically creating and destroying inboxes and services/workers on nodes within the cluster. In some embodiments, the cluster provides facilities for dynamically adding and removing meshes to/from the cluster. In some embodiments, the cluster provides facilities for dynamically adding and removing endpoints and services to/from a mesh. In some embodiments, the cluster provides communication facilities (asynchronous and synchronous) to communicate with the services in the cluster, or in a mesh, respectively. In some embodiments, the cluster provides facilities for an endpoint or service to dynamically join or leave a specific mesh. In some embodiments, the cluster provides facilities to determine the lead cluster manager for a given cluster. In some embodiments, the cluster provides facilities to send messages specifically to the current lead cluster manager for possible further distribution pursuant to policy.

In some embodiments, the system provides facilities to dynamically create and destroy a cluster. In some embodiments, the system provides facilities to dynamically create and destroy meshes on a specific cluster. In some embodiments, the system provides facilities to dynamically create a mesh, and deploy services on specified nodes within the mesh; alternatively the location for the deployment within the mesh is determined via a policy. In some embodiments, the system provides facilities do dynamically create a mesh together with associated guard policies (see below under "Policy System"). In some embodiments, dynamically created nodes, services, endpoints, meshes and clusters can each be dynamically destroyed.

In some embodiments, the system provides facilities for dynamically changing the topology of clusters and meshes to relocate a node from one cluster to another, to relocate a mesh from one cluster to another, and to relocate an endpoint or service from one mesh to another, pursuant to policy on the context of the system. In further embodiments, this is accomplished by means of topology change facilities in the Service and Endpoint Fabric, or in the Federated Service Mesh.

Figure 2:
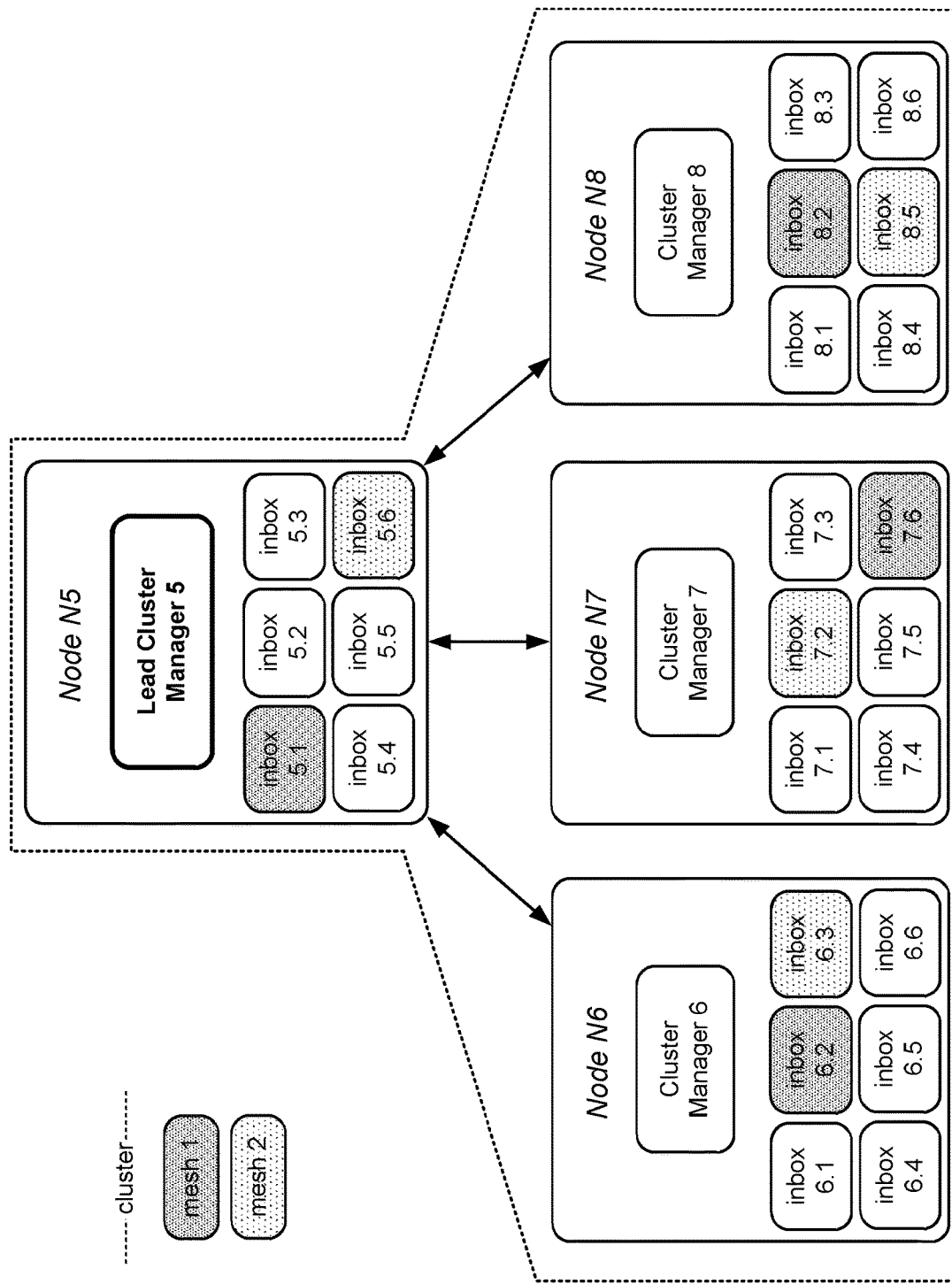
FIG. 2 shows a non-limiting, exemplary configuration of a cluster of nodes, inboxes and two meshes. In this example, nodes N5 through N8 each host a number of inboxes. Each node has its own cluster manager (Ni's cluster manager is Cluster Manager i, where i ranges from 5 to 8.) In this example, Cluster Manager 5 is the lead cluster manager. The example shows two separate meshes. Both meshes are managed by cluster managers 5 through 8. Mesh 1 consists of inboxes 5.1, 6.2, 7.6 and 8.2. Mesh 2 consists of inboxes 5.6, 6.3, 7.2 and 8.5. Inboxes 5.2, 5.3, 5.4, 5.5, 6.1, 6.4, 6.5, 6.6, 7.1, 7.3, 7.4, 7.5, 8.1, 8.3, 8.4 and 8.6 do not belong to any mesh.

FIG. 2 shows an example configuration of a cluster of nodes, inboxes and two meshes. Nodes N5 through N8 each host a number of inboxes. Each node has its own cluster manager (Ni's cluster manager is Cluster Manager i, where i ranges from 5 to 8.) In this example, Cluster Manager 5 is the lead cluster manager. The example shows two separate meshes. Both meshes are managed by cluster managers 5 through 8. Mesh 1 consists of inboxes 5.1, 6.2, 7.6 and 8.2. Mesh 2 consists of inboxes 5.6, 6.3, 7.2 and 8.5. Inboxes 5.2, 5.3, 5.4, 5.5, 6.1, 6.4, 6.5, 6.6, 7.1, 7.3, 7.4, 7.5, 8.1, 8.3, 8.4 and 8.6 do not belong to any mesh.

Meshes can be formed explicitly by specifying their constituent inboxes, or implicitly by attaching multiple services to a single inbox. When an inbox is added to a mesh, the local cluster manager (CM1, the one on the same node as the service requesting the addition of the inbox) submits that information to the lead cluster manager (LCM); the lead cluster manager then broadcasts the information to all the cluster managers in the mesh (including CM1).

Policy System

In some embodiments, each mesh can manage its resources according to policies that can also be preconfigured, or set on the fly. This enables, for instance, failover-configurations where all nodes in a mesh act as mirrors of each other, and all of them receive any message that is sent to the mesh—so that any one of the mesh members can take over for any other in case of failure. It also enables scenarios where the mesh elastically adds or deletes or reconfigures nodes or services and distributes messages among the nodes or services to accommodate changes in load or context.

In addition, in some embodiments, the policy system enables specification and enforcement of policies to determine whether a particular service is eligible to receive a given message. In further embodiments, this serves to define and exert fine-grained information assurance policies on the level of individual messages, or services, or their context, in the infrastructure. In support of the flexible policy system, the invention has, in some embodiments, plug-in capabilities for elastic provisioning of compute and storage resources. In further embodiments, these plug-ins are used during policy enactment to achieve flexible provisioning and reconfiguration of the underlying dynamic computation plane at runtime.

Specifically, in some embodiments, the invention integrates the policy mechanism with the concept of meshes to control the flow of messages within (and to and from) a mesh. In further embodiments, client services (or clients, for short) within a cluster have the ability to send messages to a mesh on that cluster, relying on the mesh's policy to determine where to route the message within the mesh.

In some embodiments, policies depend on broad information from the system's context including, but not limited to, geographical or logical constraints on where physical nodes, nodes, endpoints and services can be located within the dynamic computation plane; optimal energy-balance to be observed across all members of the dynamic computation plane participating in an instance of the system; quality constraints (such as indices associated with voice and video quality across networks, availability, throughput); events in the context of the system or its constituents (including, but not limited to, user experience, health of systems or subsystems, and results of analytics processing on the context of the system).

To that end, the invention, in some embodiments, distinguishes mesh policies and guard policies.

In some embodiments, mesh policies determine dynamically—at the point when a message is sent at runtime—which member(s) of a mesh will receive that message, and which members to direct the message to in the event the intended recipient cannot be contacted.

In some embodiments, guard policies also restrict the recipient set of messages addressed to the mesh (or any of its members), but are established at the time the mesh and its constituent services are formed, and can only be changed by eligible clients (guarded by an authorization mechanism). This prevents tampering with the guard policy system, and is thus a mechanism to implement core policies that must not be circumvented.

Figure 3A:
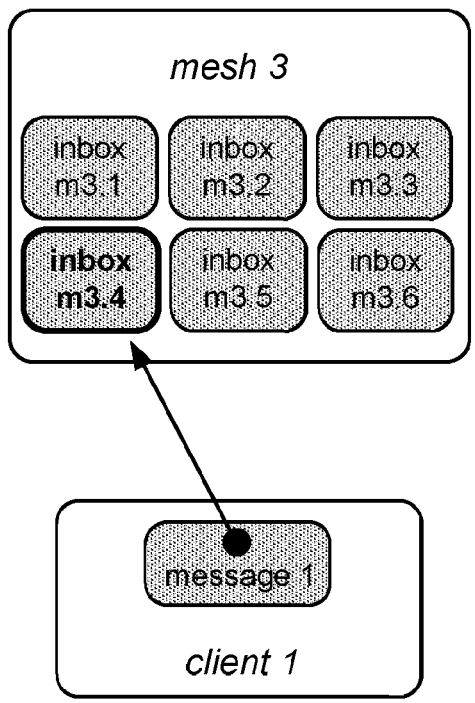
FIG. 3 shows a series of non-limiting, exemplary mesh policies. By way of example, as client 1 sends message 1, a mesh policy is evaluated that determines inbox m3.4 to be the correct recipient of the message (FIG. 3(a)). By way of further example, if inbox m3.4 (or its associated service) is unavailable to receive message 2, the example mesh policy defines inbox m4.6 as the next target for message 2 (FIG. 3(b)). In this example, a guard policy, instituted at the creation of the mesh determines inbox m5.4 ineligible for the receipt of message 3 (FIG. 3(c)).
Figure 3B:
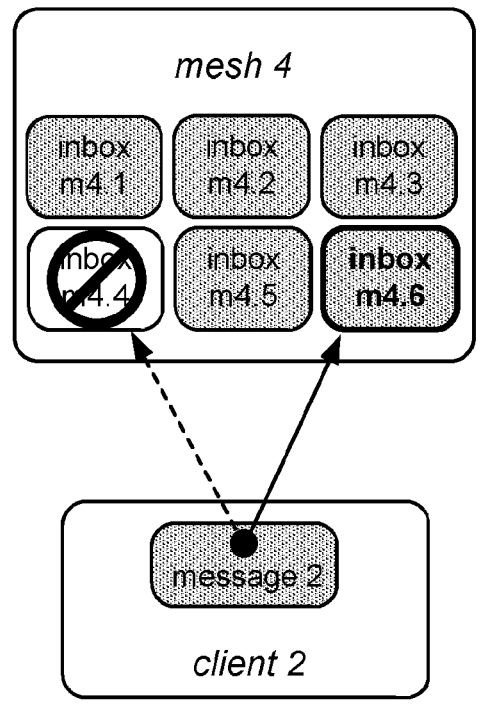
Figure 3C:
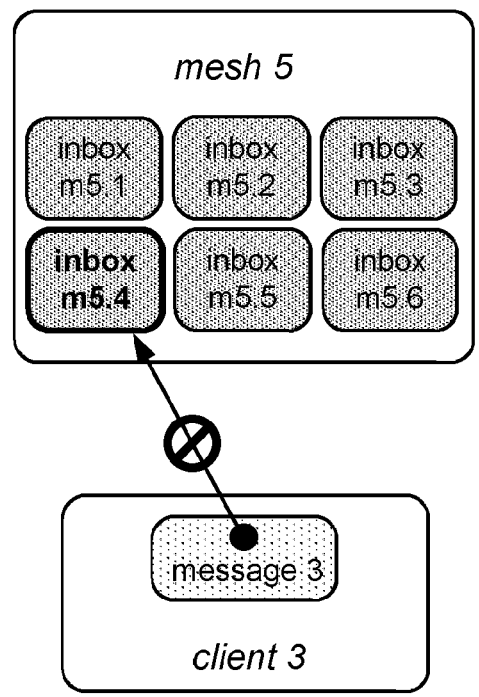

FIG. 3 shows a series of examples. As client 1 sends message 1, a mesh policy is evaluated that determines inbox m3.4 to be the correct recipient of the message (FIG. 3($a$)). If inbox m3.4 (or its associated service) is unavailable to receive message 2, the example mesh policy defines inbox m4.6 as the next target for message 2 (FIG. 3($b$)). A guard policy, instituted at the creation of the mesh determines inbox m5.4 ineligible for the receipt of message 3 (FIG. 3($c$)).

The invention allows multiple forms of composition of policies. A realization may prioritize guard policies over mesh policies, or vice versa, or specify a priority-based specification for policy interactions.

Example mesh policies include the following:

1) Random-policy: each message is dispatched to a random inbox in the mesh.

2) Round-robin-policy: dispatches messages to a rotating list of addresses each time it is called (on a per-cluster-manager basis).

3) Consistent-hash-policy: dispatches all messages from a particular client (identified either by its node's host and port, or a customized client-ID) to the same inbox.

An example guard policy is the basic-security-policy. It expects messages containing a token that has a value equal to a security token used to initialize the policy function. In some embodiments, guard-policies serve purposes more general than authorization; they can decide whether a message should be forwarded to an inbox based on arbitrary criteria. For example, a concrete implementation can realize the policy system via plug-ins (or call-back functions) that get activated on the sending of a message (for mesh policies), or upon the arrival of a message at a mesh (guard policies).

Provisioning System

In some embodiments, the invention establishes an additional plug-in mechanism specifically targeted at utilizing the elastic nature of cloud infrastructures, which enable the dynamic creation and destruction of physical nodes. To that end, in further embodiments, each cluster is equipped with a plug-in function that services deployed on that cluster can call upon to provision or decommission physical nodes.

The plug-in design, in various embodiments, facilitates the modular, transparent establishment and use of multiple different provisioners targeting a broad range of private, public and hybrid cloud platforms.

In some embodiments, the provisioning plug-in will provision nodes on physical nodes provided by a data center or cloud computing facility or provider (e.g., Amazon AWS, Rackspace, Heroku, Engine Yard, etc.), or by a local resource (e.g., server, desktop computer, laptop computer, tablet computer, mobile phone, smart phone, electronic control unit, set-top box, display, etc.) equipped with facilities to execute code on that local resource (e.g., a Java Virtual Machine environment, etc.), or by a combination thereof. In various embodiments, at any given point in time, the provisioning plug-in dynamically provisions nodes on physical nodes provided by any suitable number of data centers, cloud computing facilities, cloud computing services, local resources, or combinations thereof. In various further embodiments, at any given point in time, the provisioning plug-in dynamically provisions nodes on physical nodes provided by 1, 2, 3, 4, 5, 6, 7, 8, 9, 10, $1 \times 10^2$, $1 \times 10^3$, $1 \times 10^4$, $1 \times 10^5$, $1 \times 10^6$, $1 \times 10^7$, $1 \times 10^8$, $1 \times 10^9$, $1 \times 10^{10}$, $1 \times 10^{11}$, $1 \times 10^{12}$, or more (including increments therein) data centers, cloud computing facilities, cloud computing services, local resources, or combinations thereof.

In some embodiments, the provisioning system will acquire existing physical nodes rather than dynamically creating them.

In some embodiments, the provisioning system will release existing physical nodes rather than destroying them.

In some embodiments, the invention establishes a facility to decommission provisioned nodes, or physical nodes.

In some embodiments, the invention will provide a facility to identify nodes and physical nodes with public or private internet addresses for external and internal referencing purposes, respectively.

In some embodiments, the provisioning plug-in will transfer information about the provisioned physical nodes to the policy system for further use in its deployment process.

In some embodiments, the provisioning plug-in will provision physical nodes, and deploy nodes on the physical nodes in one step. Then it will report the provisioned nodes back to the policy system for further use in its deployment process.

In some embodiments, the provisioning plug-in will create an execution environment on the provisioned physical node that allows execution of specified processes—dependent on the concrete nature of the provisioned (or acquired) physical node.

In some embodiments, the policy system will inform the federated service meshes or cluster of the provisioned physical nodes or nodes, for further use in their deployment processes.

In some embodiments, each of the following will provide application programming interfaces (APIs) so that the provided facilities and features can be accessed from application systems: the Service and Endpoint Fabric, the Federated Service Mesh, the Policy System, and the Provisioning System.

In some embodiments, the invention will use the Provisioning System to create an initial system topology for the Service and Endpoint Fabric, on which an initial Federated Service Mesh is instantiated, equipped with tailored policies for scale, reliability and security. In such embodiments application systems will be deployed on the initial Federated Service Mesh. Further, in these embodiments, the application system will then use all or a subset of the APIs to manipulate the system topology if access to such manipulation is authorized. In some embodiments, the invention will automatically (without being explicitly triggered by the application) utilize the provisioning system, as well as the policy system to reduce and distribute load, increase reliability, and enforce information assurance.

In some embodiments, the invention will utilize provided security features, such as encryption services of messaging or database systems to provide security features. In some embodiments, the invention will provide its own services for encryption on top of existing secure or insecure execution platforms (compute, networking or data storage systems) to provide security features to application systems. In some embodiments, the invention will combine its own with provided security features.

In some embodiments, the invention will provision nodes as encrypted sandboxes within physical nodes. In some embodiments, especially in resource constrained deployment environments (e.g., mobile phones, smart phones, tablets, electronic control units, displays, etc.), the invention will create nodes that support the minimum execution environment necessary to perform the functions required by the provided APIs to establish a Service and Endpoint Fabric, Federated Service Meshes, a Policy System and a Provisioning System. Such embodiments have the ability to integrate with other embodiments that are less resource constrained to extend the federated system across all participating physical nodes.

In some embodiments, some or all of the following will receive unique identifiers (IDs): physical nodes, nodes, endpoints, services/workers, and messages. In further embodiments, these IDs are represented via Globally Unique Identifiers (GUIDs). In some embodiments, these IDs are augmented or replaced with Internet Protocol (IP) addresses and port addresses.

In some embodiments, the invention will aggregate existing systems that follow the specified structure into a new, composite system where the existing systems appear as services to the composite. In further embodiments, these services act as proxies to the existing systems. In still further embodiments, the constituent services will have policies to limit their message interfaces (i.e., the messages they are prepared to receive or produce). Such embodiments enable a hierarchical composition of systems into federated systems of systems. In some embodiments, the constituent physical nodes, nodes, endpoints, services, or messages will receive unique hierarchical identifiers to represent the hierarchical-structure of composition.

EXAMPLES

The following illustrative examples are representative of embodiments of the systems, platforms, methods, and software described herein and are not meant to be limiting in any way.

Example 1

Service Container

One exemplary use of the concepts introduced in the invention concerns the creation of a service container, i.e., an environment in which a multitude of business-specific services (implementing business processes or workflows) are paired with cross-cutting services (infrastructure services) that are interjected into the message exchanges among the business services. The service container provides a prefabricated environment for the composition and encapsulation of business services under the governance of policies on authorization, authentication, and corresponding policies for failover and security.

Figure 4:
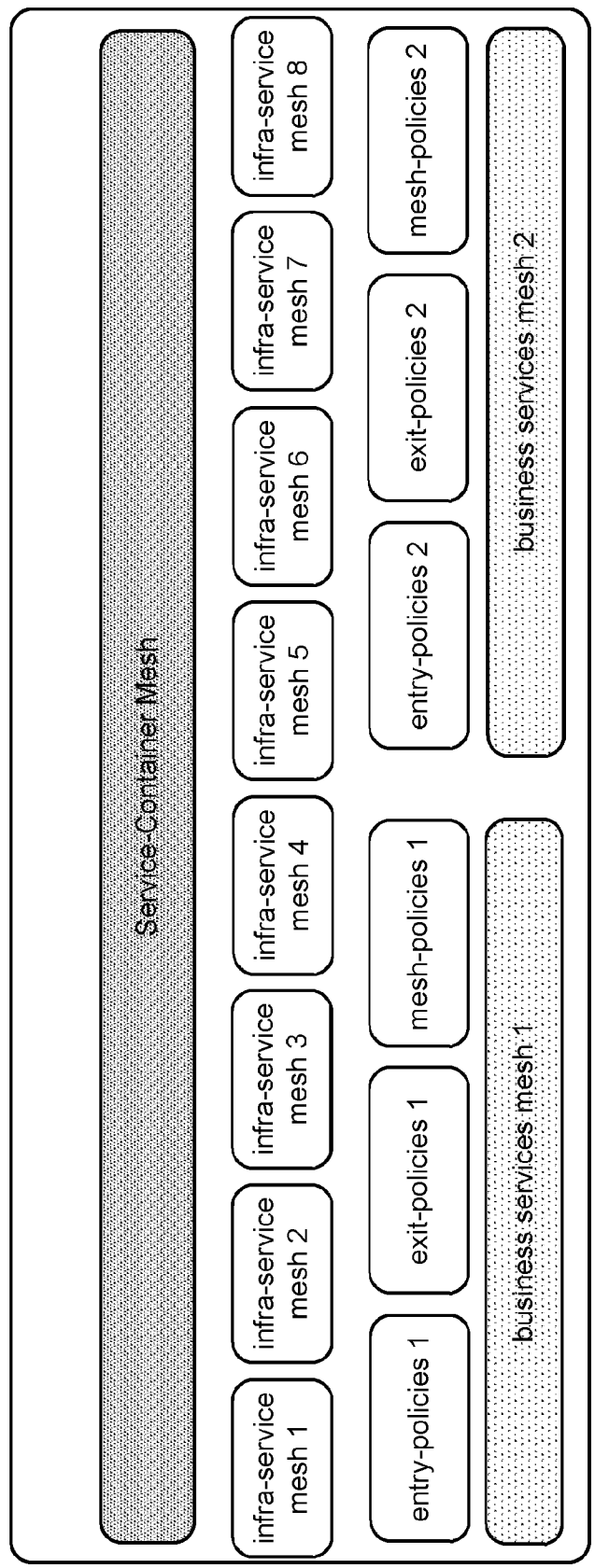
FIG. 4 shows a non-limiting, exemplary service container; in this case, a service container implemented with separate meshes for the interface to the environment of the service container, infrastructure services, and business services.

Service containers are implemented as clusters, with separate meshes for the interface to the environment of the service container (service-container mesh), the infrastructure services, and the business services. Each of these mesh categories can, in fact, be implemented via multiple separate meshes, depending on the desired concrete combinations of policies for deployment, failover and security necessary for an instantiation of the container. These meshes enjoy the federation and dynamicity of the underlying invention. Specifically, as depicted schematically in FIG. 4:

1) The service container mesh can be configured to allow access to the container's internal services only to eligible clients; the service container mesh can establish policies for the dynamic and elastic deployment of its internal services. Furthermore, with appropriately chosen mesh/guard policies between the service-container mesh, and the constituent infrastructure-service and business services meshes, the service container can prevent direct access to any of its constituent service meshes by an outside client.

2) The business services meshes 1 and 2 can be configured with unique entry/exit guard and mesh policies to govern how messages targeted for each of the members of the mesh should be routed (on entry or exit of a message, or from any intermediate processing step to the next); this routing can weave together infrastructure services (from the respective meshes) with message flows from the business service meshes. In particular, the meshes can be configured to take receipt of any incoming message, to pre-process the message (for instance for removing or adding pertinent information) to then expose the message to further policy processing (including routing or rerouting of the message), performing post-processing on the message (for instance for removing or adding other pertinent information), and then delivering the message to the now-relevant target.

3) Each of the meshes can be statically and dynamically deployed across a broad range of statically and dynamically provisioned physical nodes. Specifically, business services mesh 1 might consist of the same service specification, deployed across three different cloud providers, with specific mesh/guard policies to redundantly execute the service on each provider, and then waiting for the result from each provider, and handing the majority result back to the client (triple modular redundancy). This allows the service container to have a federated footprint across and control of a vast underlying dynamic computation plane. This allows creation of meshes for fault-tolerance, as well as for replication (for scale), and for policy-driven access to services: exit-policies can prevent the escape of unprocessed data from any mesh, entry-policies can prevent the entrance of requests from ineligible parties (as in hacking attempts, or denial of service attacks), mesh policies can enforce the logging or encryption of messages while in flight or (together with guard policies) while at rest.

4) The specification of the deployment and provisioning of a container and its constituent services, and policies can be accomplished via a domain-specific language and a compiler that automatically translates such specifications into corresponding instances of federated service meshes.

Example 2

Health Information System

Another exemplary use of the concepts introduced in the invention demonstrates the use of the Service Container of Example 1 and the plain federated service mesh to address challenging user and system requirements in health-care systems engineering. One such system is a mobile health platform (MHP); in short, the system integrates mobile devices (from simple cellular phones with SMS capability, to smart phones, to tablet computers) into a sophisticated cloud-based computing, data and networking system that allows for (semi-) automated fusion and analysis of patient information, enabling more consistent, faster, cost-effective and targeted healthcare—even in environments where desktops or laptops are impractical (e.g., a battlefield or remote area in a developing country with little to no IT services at the point of care).

The system is designed as Service-Oriented Architecture (SOA). SOAs use standards-based infrastructure to forge flexible, large-scale systems out of loosely coupled, interoperable services. This lends itself particularly well to the MHP and its applications, because both can be expected to evolve rapidly and independently to accommodate a wider range of providers, users and practitioners, as well as changing and growing feature sets during both construction and operation. At the same time, the MHP faces strict requirements at policy definition, enforcement and auditing—these are clearly cross-cutting infrastructure concerns that should be available to all applications of the MHP. Traditional SOAs have been challenged with the handling of cross-cutting concerns, because client/server communication patterns often dominate deployment when Web Services are used to implement SOAs. This also challenges scalability, and provides little handle on fault-tolerance and common policy definition and enforcement in large-scale architectures. To address these challenges, the MHP is designed using a set of carefully-chosen concepts that together deliver the desired quality requirements:

1. Resources and Services. The MHP treats all elements of the integrated system as resources that present themselves to the infrastructure via services. Examples include neighboring systems and data producers (such as the National Health Information Systems, healthcare and insurance providers), but also secure messaging, computation, persistence and workflow execution capabilities. These services are bound together via the Secure Messaging, Routing & Interception Platform, described below.

2. Secure Messaging, Routing & Interception Platform. This platform provides the mechanics of message exchange and coordination among all resources connected to the MHP. Besides plain messaging it also offers the ability to inject targeted infrastructure services into the exchange. This is the mechanism of choice to enable event detection, as well as general policy enforcement in the MHP.

3. Federation. The deployment of the MHP uses the concept of federation, i.e., offering the system as a cooperative of multiple servers, each of which can independently deliver the system's functionality. This addresses both fault-tolerance (if a server fails, the system transparently switches to another one that is functional) and scale (if a server is under load, the system instantiates a new one and dynamically adds it to the federation). This reduces single-points-of-failure, and increases the ability to distribute workload while offering a uniform application execution environment.

4. Deployment Node Types. For deployment we distinguish between three configurations: application nodes carrying the application logic, persistence nodes offering the persistence mechanism (such as a Riak database), and processing nodes hosting computations and algorithms. Each such node carries the MHP service container (the MHP federated "operating system") so that all the cross-cutting services are available at each node to applications and services offered at that node.

5. Scale Group. A scale group is a set of instances of Deployment Node Types deployed on physical nodes (e.g., a private server, or a private or public cloud-hosted server, or an appliance such as a data ingest server on the premises of a provider, or a cell phone that can participate in the deployment of the service container). Each scale group has its own policy for elastically acquiring and releasing (cloud) resources depending on load and other factors. The system will provision one scale group each for application, ingest, persistence and processing nodes.

6. Head and Scale Nodes. Within each scale group Head Nodes are the node type instances that act as the primary targets for user requests. These Head Nodes can perform the workload themselves, or farm it out to other "worker bees," i.e., Scale Nodes. Scale Nodes are functionally equivalent to Head Nodes, except they do not further delegate work to other scale nodes.

7. Applications. The MHP offers a set of applications that utilize the infrastructure concepts 1-7 to offer added-value health-care. Examples include authoring and publishing tools, health portals and phone applications.

High-Level System View

Figure 5:
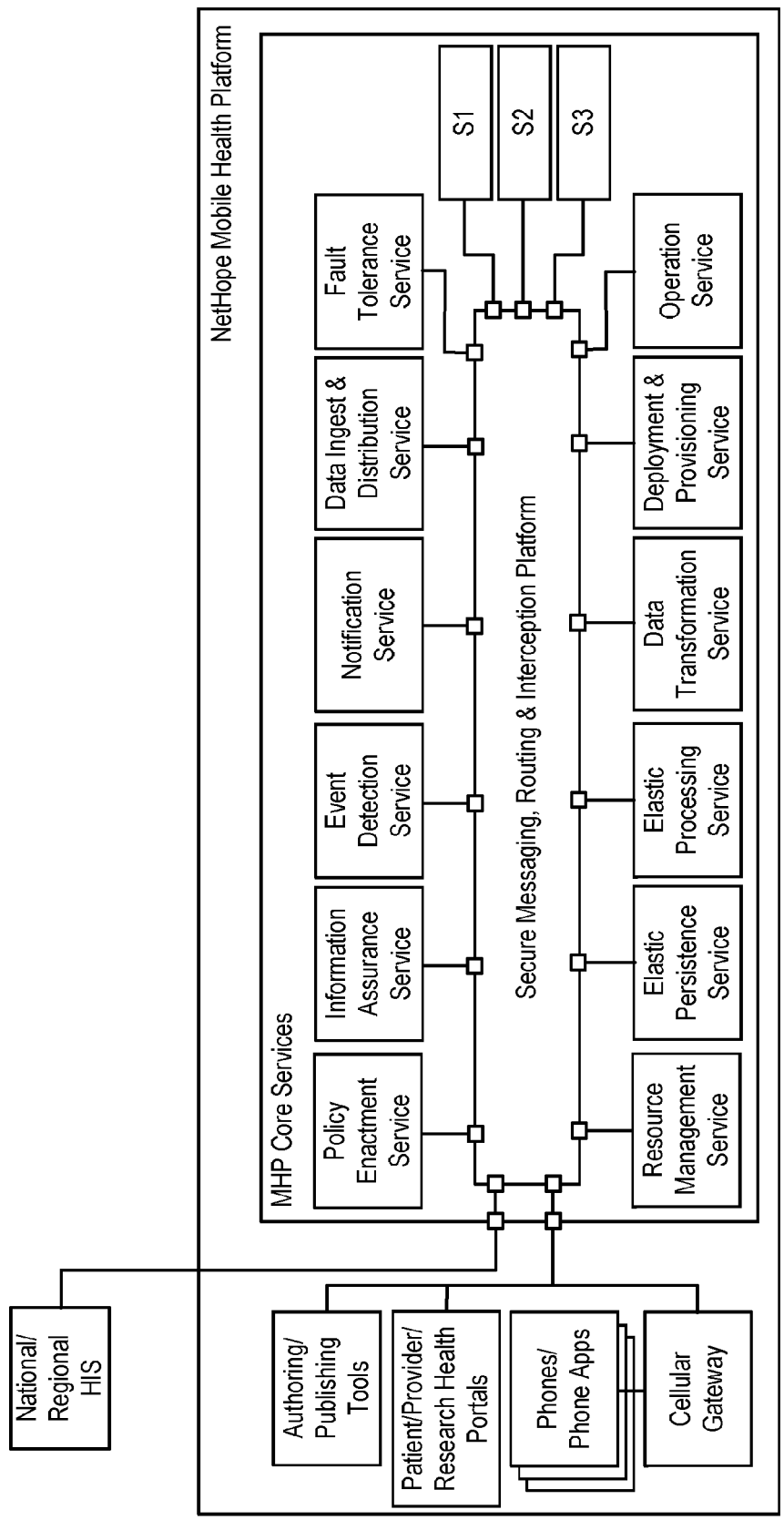
FIG. 5 shows a non-limiting, high-level, logical architecture of an embodiment of the invention in health-care systems engineering; in this case, a mobile health platform (MHP).

FIG. 5 shows a high-level, logical architecture of the MHP. All applications and services connect via the Secure Messaging, Routing & Interception Platform. The core services of the MHP include resource management, policy enactment, authentication/authorization, event detection, notification, data ingest, distribution and transformation, fault tolerance, deployment & provisioning, operations, as well as elastic computation and persistence.

Furthermore, as examples of business services, the MHP includes S1, S2, and S3, each of which is implemented using the federated service mesh, and integrated into a service container. These services could, for instance, be provided by external service providers, to match patient IDs, or perform other processing tasks on patient data.

These services altogether provide the fabric on which existing and emerging health care applications can deploy and operate. Specifically, the MHP will have a cellular gateway for two-way voice and SMS communication with cell phones; phone-apps that target the level of the sophistication across pure voice/text-based, J2ME-based and smartphone-based capabilities; form-authoring and publishing tools to support health care workflows in the field; and patient/provider/research health-portals with unprecedented capabilities of pro-active, active and retro-active patient care and involvement.

Each application/gateway is assigned a unique in/outbound channel into/out of the MHP. There, the Data Ingest Service takes control of incoming and outgoing data and presents it to the infrastructure and its applications, including to the Data Transformation Service. Message routing within the MHP is fully configurable at both deployment and runtime, subject to policies defined for the MHP.

Figure 6:
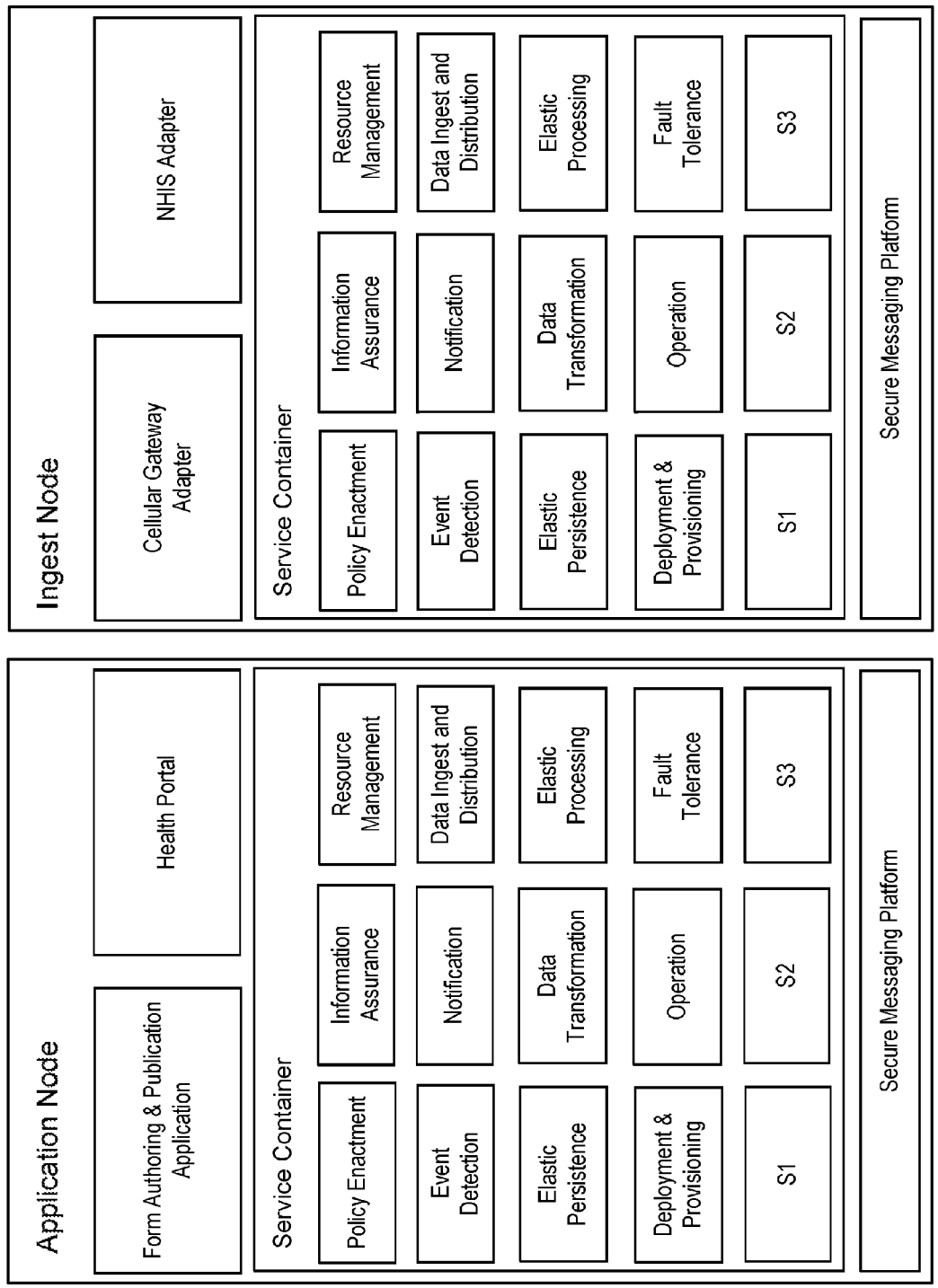
FIG. 6 shows a non-limiting architecture of a MHP system comprising: application, ingest, persistence and processing nodes. In some embodiments, each node carries a secure messaging platform, and a service container as the collection of all infrastructure services needed to establish the MHP "operating system."
Figure 6:
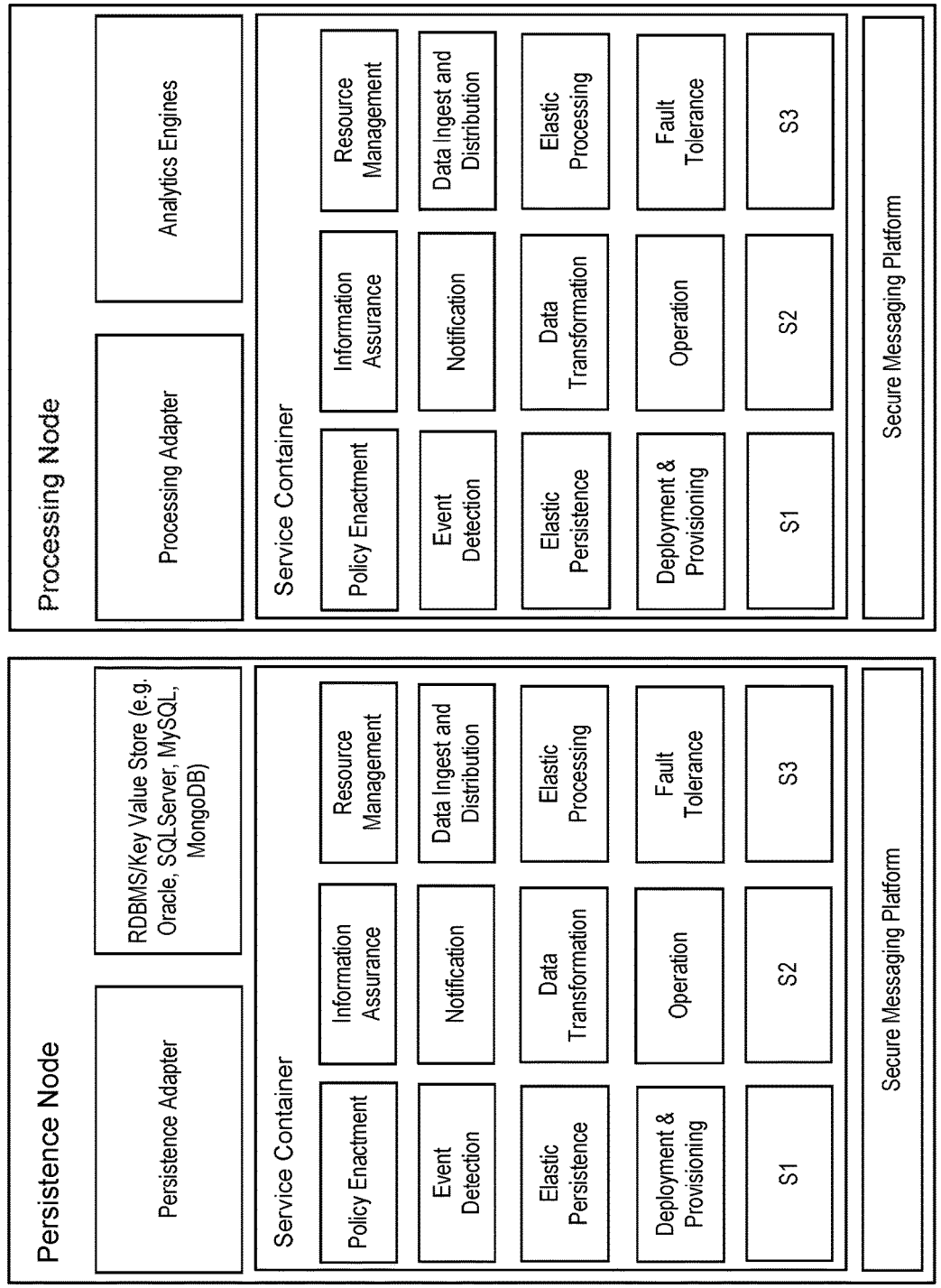

FIG. 6 shows a high-level logical decomposition of the MHP with its core services, applications, gateways and interface to the national or regional HIS.

Deployment Node-Types

FIG. 6 also shows the four deployment node types the MHP system includes: application, ingest, persistence and processing nodes. Each carries the secure messaging platform, and the service container as the collection of all infrastructure services needed to establish the MHP "operating system."

1) Application Nodes serve user-facing applications, including authoring and publishing tools, administrative tools, and health portals.

2) Ingest Nodes serve adapters to cellular gateways for receipt and transmission of messages and other interactions with mobile platforms, as well as adapters to neighboring systems, such as the NHIS (or other instances of the MHP).

3) Persistence Nodes serve adapters to database/persistence implementations to facilitate repositories for the multitude of data and metadata to be stored in or transported through the MHP.

4) Processing Nodes serve adapters to execution platforms for algorithms for health care analytics, as well as the algorithms themselves.

High-Level Deployment Architecture

The initial deployment of the MHP consists of four scale groups—one each for application, ingest persistence and processing nodes. Each Scale Group will have three Head Nodes, configured to support fault-tolerance and load-balancing. Each Head Node will come configured with and support 10 Scale Nodes.

Figure 7:
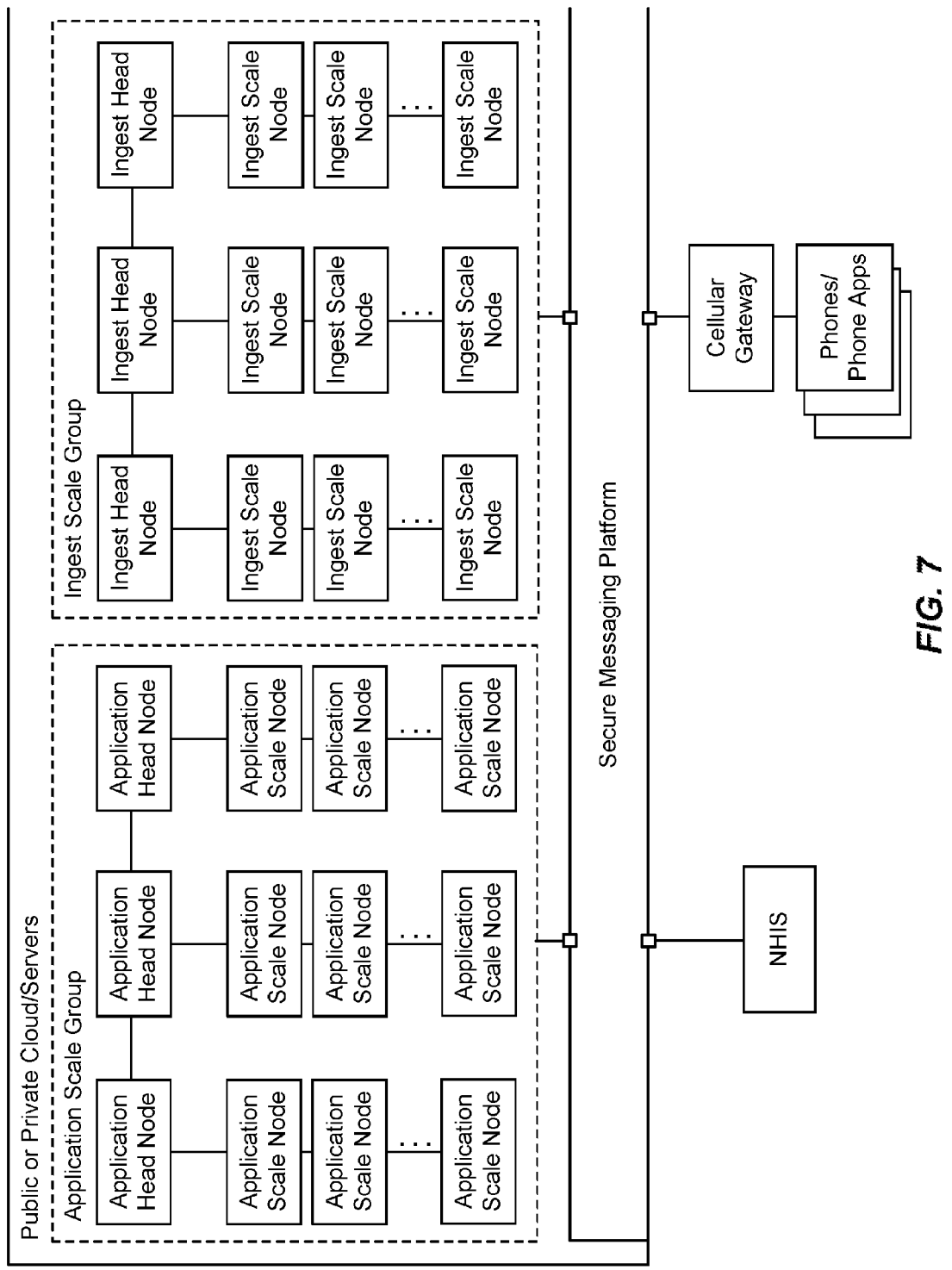
FIG. 7 shows a non-limiting, exemplary MHP deployment; in this case, a deployment including interfaces to the NHIS, cellular gateway, as well as web and other clients for form authoring/publication and (research) portals.
Figure 7:
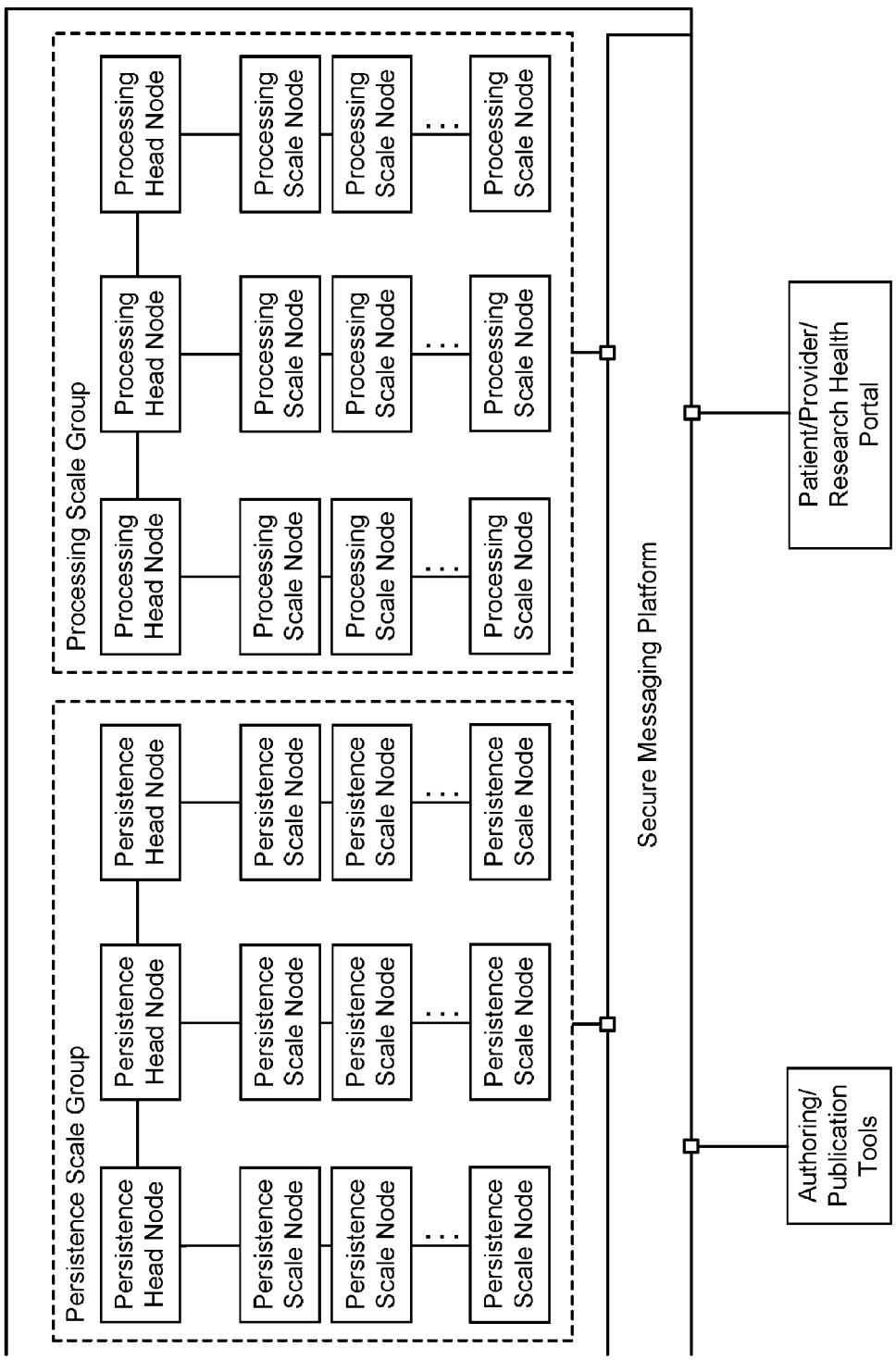

FIG. 7 shows this example deployment with interfaces to the NHIS, cellular gateway, as well as web and other clients for form authoring/publication and (research) portals.

Mapping to the Invention

The MHP example maps directly to the invention:

1) The MHP's services translate into services of the federated service mesh.

2) The overall system becomes a cluster.

3) Scale groups translate into meshes on the cluster.

4) Head nodes translate into specific service containers with a load-balancing and triple-modular redundancy policy implementation.

5) Scale nodes translate into service containers without or with optional load-balancing and redundancy.

6) The service containers are prefabricated to contain the respective policy meshes, as well as business services (including example application services such as S1, S2, and S3). The interactions among business services and among business services and infrastructure services are governed by appropriately chosen routing and information assurance policies.

7) The secure messaging platform can be established with an off-the-shelf message bus, such as HornetQ.

8) External systems, such as NIHS, and portal applications can be federated into the overall system by extending the service container to the respective appliances (servers or mobile devices), thus effectively proxying these appliances into the federation; alternatively, these systems can also be brought in via explicit gateways that interface with the MHP via ingest services.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A distributed computing platform providing at least partially automated deployment, operation, and maintenance of a cloud based application, the platform comprising:

a plurality of Internet addressable physical nodes, the physical nodes including one or more stationary servers or virtual servers, wherein at least some of the physical nodes are instantiated across a plurality of cloud service provider facilities;

a plurality of message queues and associated services hosted by the physical nodes;

a policy system including policies defining a system topology of physical nodes, message queues, and services, including at least geographical or logical constraints on locations of physical nodes, message queues, and services;

a provisioning system that is configured to create the physical nodes on the plurality of cloud service provider facilities to form an instantiation of the system topology as defined by one or more of the policies, and is further configured to change an existing system topology in accordance with one or more of the policies, wherein the changing is effected by one or more of modifying one or more associations between physical nodes, message queues, and services, creation or deletion of physical nodes, message queues, and services, and relocation of physical nodes within one of the cloud service provider facilities or from one cloud service provider facility to another cloud service provider facility.

2. The platform of claim 1, wherein the provisioning system is further configured for dynamically managing collections of message queues and associated services as nodes on physical nodes and is configured to provide management functions selected from the group consisting of: allocating, creating, deploying, relocating, and destroying nodes on physical nodes.

3. The platform of claim 1, wherein the physical nodes also include one or more of mobile devices, computationally capable sensors, actuators, sensor actuator combinations, cell phones, smart-phones, laptop computers, tablet computers, electronic control units, set-top boxes, and displays.

4. The platform of claim 2, wherein a node comprises an association of a plurality of inboxes.

5. The platform of claim 4, wherein a cluster comprises an association of a plurality of nodes.

6. The platform of claim 5, wherein each of the plurality of nodes in the cluster comprises a cluster manager for the cluster.

7. The platform of claim 5, wherein a mesh comprises an association of a plurality of inboxes, at least two of the plurality of inboxes associated with different nodes.

8. The platform of claim 7, wherein a first mesh comprises a plurality of services, each with an equivalent service specification,
wherein a first service of the plurality of services is deployed on a first cloud service provider,
a second service of the plurality of services is deployed on a second cloud service provider, and
wherein a policy corresponding to the first mesh is configured to cause the platform to redundantly execute the first and second services on each of the respective first and second cloud service providers in response to a service request sent to the first mesh.

9. The platform of claim 1, comprising a compiler that translates the policies into an instantiation of the system topology.

10. The distributed computing platform of claim 1, wherein at least one of the policies
compares message sources with predetermined whitelists of addresses, reprovisions fresh nodes to deal with additional incoming requests, and creates fresh instances of the entire topology only accessible by whitelisted request sources; and wherein the provisioning system is configured to execute the policy.

11. A distributed computing platform providing at least partially automated deployment, operation, and maintenance of a cloud based application, the platform comprising:
a plurality of Internet addressable physical nodes, the physical nodes including one or more stationary servers or virtual servers, wherein at least some of the physical nodes are instantiated across a plurality of cloud infrastructure service provider facilities, wherein separate domains of authority grant access to computational resources of each of the cloud infrastructure service provider facilities, and the cloud service provider facilities have heterogeneous infrastructure technologies;
a plurality of message queues and associated services hosted by the physical nodes;
a policy system including policies defining a system topology of physical nodes, message queues, and services, including at least geographical or logical constraints on locations of physical nodes, message queues, and services;
a provisioning system that is configured to create the physical nodes on the plurality of cloud infrastructure service provider facilities to form an instantiation of the system topology as defined by one or more of the policies, and is further configured to change an existing system topology in accordance with one or more of the policies, wherein the changing is effected by one or more of modifying one or more associations between physical nodes, message queues, and services, creation or deletion of physical nodes, message queues, and services, and relocation of physical nodes from one cloud infrastructure service provider facility to another cloud infrastructure service provider facility.

12. The platform of claim 11, wherein a first mesh comprises a plurality of services, each with an equivalent service specification,
wherein a first service of the plurality of services is deployed on a first cloud infrastructure service provider,
a second service of the plurality of services is deployed on a second cloud infrastructure service provider, and
wherein a policy corresponding to the first mesh is configured to cause the platform to redundantly execute the first and second services on each of the respective first and second cloud infrastructure service providers in response to a service request sent to the first mesh.

\* \* \* \* \*